Aug. 10, 1943.   R. E. MARBURY   2,326,151
WATER COOLED CAPACITOR
Filed Nov. 27, 1940   3 Sheets-Sheet 1

WITNESSES:

INVENTOR
Ralph E. Marbury.
BY
ATTORNEY

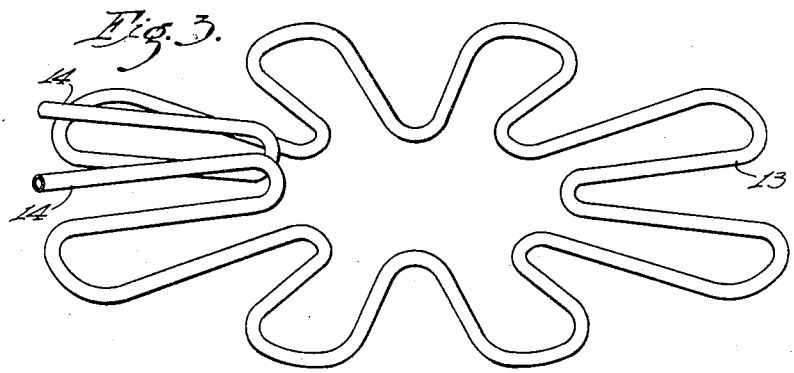
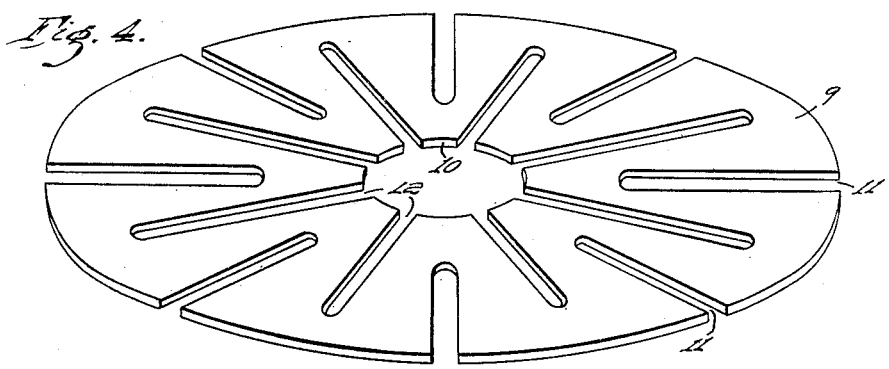
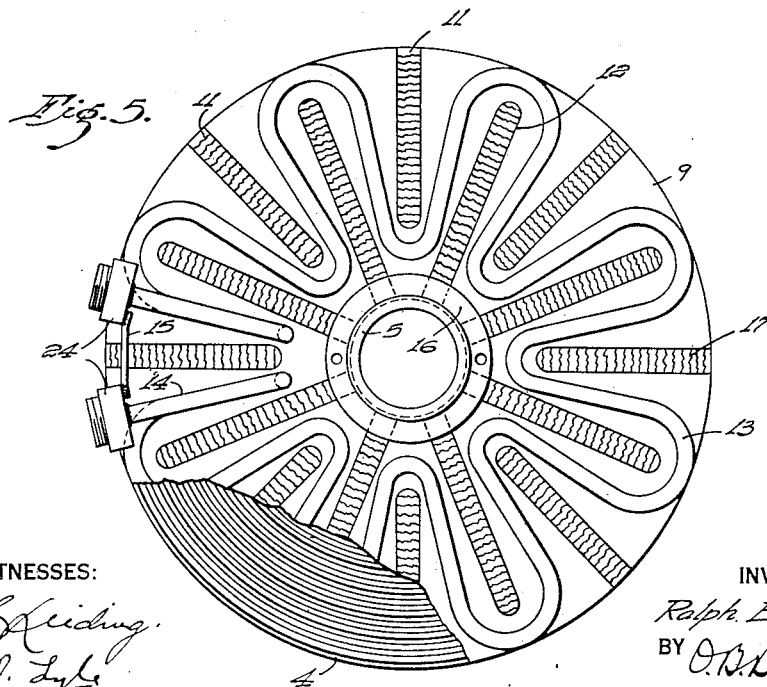

Aug. 10, 1943.   R. E. MARBURY   2,326,151
WATER COOLED CAPACITOR
Filed Nov. 27, 1940   3 Sheets-Sheet 3

WITNESSES:
INVENTOR
Ralph E. Marbury.
BY
ATTORNEY

Patented Aug. 10, 1943

2,326,151

UNITED STATES PATENT OFFICE 2,326,151

WATER-COOLED CAPACITOR

Ralph E. Marbury, Wilkinsburg, Pa., assignor to Westinghouse Electric & Manufacturing Company, East Pittsburgh, Pa., a corporation of Pennsylvania Application November 27, 1940, Serial No. 367,368

4 Claims. (Cl. 175—41)

The present invention relates to capacitors and, more particularly, to an improved water-cooled capacitor for high frequency service.

The capacitor of the present invention is particularly adapted for power factor correction in high frequency installations. At the present time, the use of high frequency induction heating is rapidly increasing, especially for such processes as heating and melting of metals and certain types of heat-treating, such as surface hardening. Frequencies of the order of 1,000 or 2,000 cycles per second have been used for this type of heating, but there is a marked trend to the use of higher frequencies, and frequencies as high as 10,000 cycles are beginning to be used, with the probability that much higher frequencies, such as 50,000 or even 100,000 cycles, will be used in the future. The equipment utilized for supplying high frequency induction heating apparatus usually has a very poor power factor, and in order to make the process economically practical, it is necessary to use capacitors to improve the power factor to a point where the cost of the high frequency generating equipment is not excessive. The capacitor of the present invention is particularly intended for this service, although its usefulness is not necessarily restricted to this particular application, and it can be used satisfactorily on frequencies as high as 100,000 cycles.

When capacitors are designed for these high frequencies, very high kva. capacities are obtained, since as the frequency is increased on a given dielectric which is subjected to a given voltage stress, the capacity increases in direct proportion to the increase in frequency. The losses, however, also increase in at least the same proportion, and the rating which can be given to a high frequency capacitor unit is therefore limited by the temperature rise of the dielectric caused by the losses in the unit. Thus, in order to take advantage of the higher capacity of a given size capacitor unit on high frequencies, it is necessary to provide means for cooling the unit, and the kva. rating which can be given to it depends on the effectiveness of the cooling means in removing the heat to keep the temperature of the dielectric within safe limits. The rating of a high frequency capacitor is also limited by the ability of the current carrying parts of the unit to handle the increased current, and the limited current carrying capacity of the terminal studs and internal leads of capacitors of conventional construction has been a serious limitation on the design of high frequency capacitors. Other difficulties are also encountered when capacitor units of conventional construction are used on high frequencies, such as the large hysteresis loss in the steel case, and the eddy current losses caused by conducting the currents through terminals which extend through openings in the steel case. These losses add considerably to the total losses in the unit and can only be avoided or reduced by using special constructions which greatly increase the cost of the unit. Trouble has also been occasioned by breakage of the porcelain terminal bushings under the stresses imposed on them by the heavy bus bars required to carry the large currents.

The capacitor unit of the present invention has been specially designed to eliminate these difficulties and it has very high capacity even on extremely high frequencies. Very effective removal of heat is obtained by utilizing copper foil of high thermal conductivity with all of the foil connected directly to the cooling means and with a short path for the flow of heat so that the maximum cooling effect is obtained. With this construction as much as 98% or 99% of the heat generated in the unit is removed by the cooling water, as compared to not more than 90% of the heat with any previous type of construction of water cooled capacitors. By connecting the entire cross-section of the foil to the cooling means and using the cooling means as an electrical conductor to carry the current to metal end covers, very high current carrying capacity is obtained, and the use of internal leads and terminal studs is eliminated. The unit has an insulating housing, preferably of porcelain, which eliminates the problems of hysteresis and eddy current losses mentioned above and which insulates the metal end covers from each other. In this way, a very effective construction is provided which makes it possible to build a capacitor having about twice the kva. rating which could be given to a capacitor of equal size of any previously utilized type of construction for water cooled capacitors, and for about the same cost. The new capacitor has about thirty-three times the rating of a similar unit without any cooling means.

The principal object of the invention, therefore, is to provide a water-cooled capacitor unit of improved construction for use on high frequencies, where the thermal capacity is the controlling factor in the design, in which the heat generated by the losses in the unit is very effectively removed, and in which no hysteresis or eddy current losses can occur.

A further object of the invention is to provide a water-cooled capacitor unit in which the entire cross-section of the metallic foil is used to carry current, and in which no internal leads or terminals are required, so that a very high current carrying capacity is obtained.

Another object of the invention is to provide a water-cooled capacitor unit in which there is a very short path for the flow of heat to the cooling means, and in which both ends of the unit are equally cooled to obtain the most effective removal of heat.

A still further object of the invention is to provide a capacitor unit of very rugged construction which will permit the use of heavy bus bars to carry the very heavy currents encountered as a result of the high rating and high current carrying capacity of the unit. The use of bus bars of relatively heavy cross-section has been very difficult, if not impossible, with units of previous types of construction, in which porcelain terminal bushings were used, because of the danger of breakage of the terminals. In the capacitor of the present invention no terminals are required, and there is no difficulty in using bus bars as large as may be required to carry the currents. The necessity of using bus bars to connect individual units together is entirely eliminated so that few bus bars are required in a complete installation.

Other objects and advantages of the invention will be apparent from the following detailed description, taken in connection with the accompanying drawings, in which:

Fig. 3 is a perspective view of a cooling coil;

Fig. 4 is a perspective view of a cooling plate;

Fig. 5 is a plan view, partly broken away, of the assembled capacitance element and cooling plate.

Figure 2:
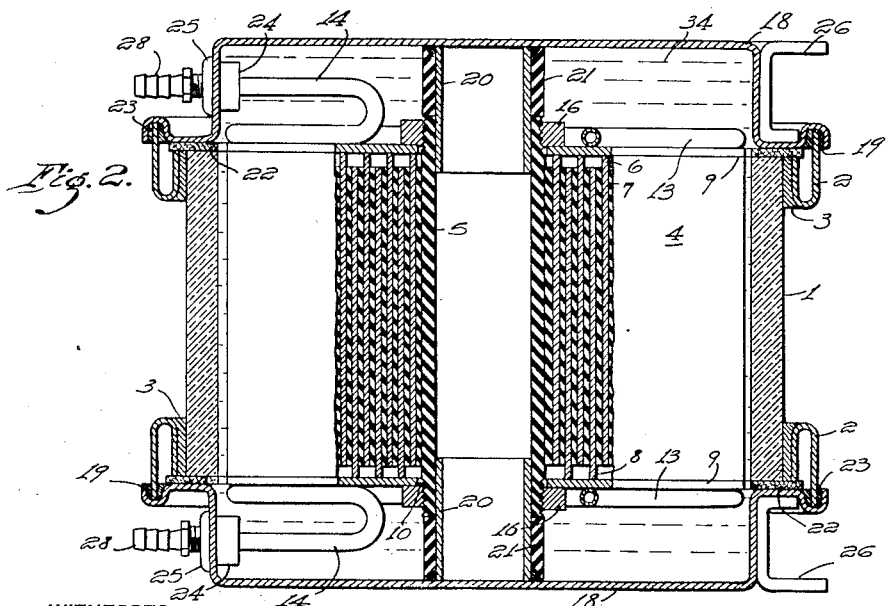
Fig. 2 is a vertical sectional view of the capacitor of Fig. 1.

The drawings show a preferred embodiment of the new capacitor unit. This unit is contained in a generally cylindrical porcelain housing 1 which has a copper ring 2 secured to each end of it for attachment of the end covers as hereinafter explained. As shown in Fig. 2, the rings 2 are of generally V-shaped cross-section with one leg longer than the other, and they are preferably secured to the housing 1 by soldering them directly to a metallic glaze applied to the surface of the housing, as indicated at 3, so that the rings are permanently sealed to the porcelain housing with an air- and liquid-tight seal. The porcelain housing 1 with the copper rings 2 soldered to it is the preferred construction, but other insulating materials, such as glass or cellulose acetate might also be used for the housing, if desired, with metallic rings 2 sealed to the housing in any suitable manner, such as by using an alloy which is capable of forming a permanent seal directly with the material of the housing.

The capacitor element 4 consists of alternate layers of copper foil and thin, high quality paper dielectric. The interleaved foils and paper are wound up on a tube 5 of hard fiber, or other suitable insulating material, to form a spirally wound capacitor element, the total length of the foils and paper being great enough to provide the desired capacitance in a single element or section. As clearly shown in Fig. 2, in which the thickness of the foils and dielectric is greatly exaggerated for the sake of clearness, the foils 6 of one polarity extend beyond the paper dielectric 7 at one side of the capicitor element 4, and the foils 8 of opposite polarity extend beyond the paper dielectric 7 at the opposite side of the element. The completed capacitor element 4 may be impregnated after winding with a suitable insulating compound in the usual manner.

A cooling plate 9 is placed on each side of the capacitor element 4 in order to effectively remove the heat generated in it, and also to provide for electrical connection to the foils 6 and 8. As shown in Figs. 3 and 4, each of the cooling plates 9 is a circular copper plate with a central opening 10 of large enough diameter for the tube 5 to pass through it. Each plate has a plurality of radial slots 11 extending from its outer periphery towards the center, and a plurality of radial slots 12 extending outward from the inner periphery between the slots 11. A cooling coil 13, preferably of copper tubing, is provided for each plate 9, and as shown in Fig. 3, this coil is formed in a sinuous or generally star-shaped configuration so that it will fit between the slots of the cooling plate 9. The ends 14 of the coil 13 are bent upwardly out of the plane of the coil and extend radially outward to pass through the end cover of the unit as described below. The cooling coil 13 is placed on the plate 9 resting on the areas between the slots 11 and 12, as shown in Fig. 5, and the coil is then soldered to the plate throughout its entire length. Bushings 24 are soldered to the ends 14 of the coil and a strip 15 of copper may be soldered to the bushings to brace the ends of the coil. It will be seen that with this construction, the plate 9 and the coil 13 form a unitary cooling element, and that the coil covers practically the entire surface area of the plate 9 to obtain the maximum withdrawal of heat from the plate.

Two cooling plates 9 are provided, and they are placed one on each side of the capacitor element 4, as shown in Fig. 2. Each plate is clamped against the extending foils 6 or 8 at its side of the capacitor element 4 by means of a steel collar 16, which is threaded on the tube 5 so that the cooling plates 9 are held firmly against the extending foils. After the plates 9 have been thus clamped in position, the foils 6 and 8 are soldered to them through the slots 11 and 12; the full length of the slots being filled with solder, as indicated at 17 in Fig. 5, so that the entire cross-section of the foil is securely and permanently joined to the cooling plates with a connection of good thermal and electrical conductivity.

Figure 1:
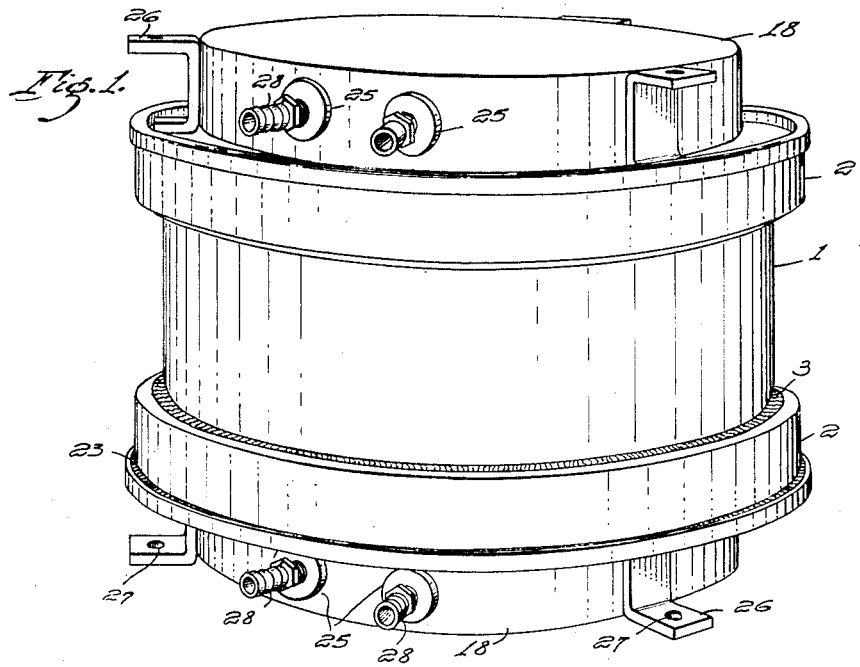
Figure 1 is a perspective view of a complete capacitor unit.

The open ends of the housing 1 are closed by metal end cover members 18, which are preferably of copper. As most clearly shown in Figs. 1 and 2, these covers are generally cup-shaped and have an annular groove 19 extending around the outer periphery to permit them to readily be soldered to the copper housing rings 2. Each cover 18 also has a short length of copper tube 20 soldered in the center of its inside surface for centering and supporting the tube 5 which carries the capacitor element 4. In assembling the unit, the tube 5 is placed over the tube 20 of the bottom cover 18 with a spacer 21 of insulating material between the end of the tube 5 and the cover, the spacer being cut to the proper length to center the capacitor element 4 in a vertical direction. A gasket 22 is placed on the cover and the porcelain housing 1 is then placed in position on the gasket, and the ring 2 soldered to the cover in the groove 19, as indicated at 23. The gasket 22 prevents the direct flow of heat from this soldering operation to the soldered seal 3, while the long path for the flow of heat through the outer leg of the ring 2 causes the greater part of the heat to be dissipated before reaching the seal 3, so that it is not loosened by the heat of this subsequent soldering operation. The upper cover 18 is assembled on the housing 1 in the same manner, with a similar spacer 21 to maintain the tube 5 in position, and it is soldered to the ring 2 at the upper end of the housing in the same way. The bushings 24 on the ends 14 of the coils 13 extend through suitable openings in the covers 18 and after the covers have been soldered to the housing rings 2, nuts 25 are threaded on the bushings 24 to secure the cooling coils in position. The nuts 25 are then preferably soldered to the covers 18 to make a tight seal and to provide a good electrical connection between the coils and the cover. Suitable fittings 28 may be attached to the bushings 24 for connection to an external water system. Each cover also has three copper lugs or brackets 26 soldered or brazed to its external surface at equally spaced points about the periphery, and these lugs are provided with holes 27 for the reception of mounting bolts to support the unit in position. After the unit is completely assembled, it is filled with a suitable liquid insulating compound 34 through openings provided for the purpose in the covers 18, these openings being then closed and sealed.

It is preferred to use copper foil in the construction of this unit, as indicated above, because of its high thermal and electrical conductivity, although other metallic foils might possibly be used. Copper foil produced by rolling cannot be made thin enough for use in capacitors, but thin copper foil produced by electrolytic deposition is now available, and this is the preferred material for use in the capacitor of the present invention. Since the copper foil has very high thermal conductivity and the entire cross-section of the foil is directly joined to the cooling plates 9, and since both ends of the unit are connected to cooling means so that there is only a relatively short path for the flow of heat to the cooling coils, the heat generated in the unit is very effectively removed, and it has been found that as much as 98% or 99% of the heat is removed by the cooling water which is circulated through the coils 13. The new capacitor unit also has very high current carrying capacity. No internal leads and no terminal studs are required since current flows through the brackets 26 and the cover 18 to the cooling coil 13 and cooling plate 9, to which the capacitor foils are directly connected. Since the entire cross-section of the foil is connected to the plate, and since the cooling coil is of relatively heavy cross-section and is cooled by the flow of water through it, the current carrying capacity of the unit is extremely high, and it can safely handle currents as high as 2,000 amperes, which is far in excess of any current that could conceivably be carried by any previous known type of high frequency capacitor unit.

Figure 6:
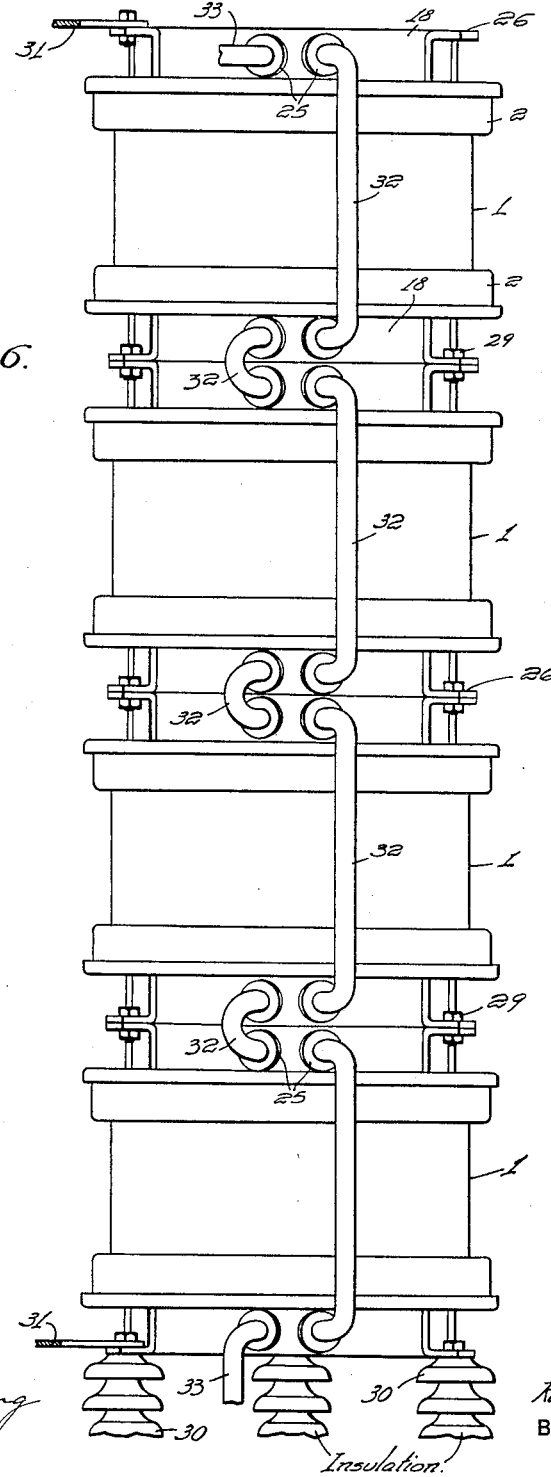
Fig. 6 is an elevation showing several capacitor units assembled in a bank.

In the actual use of this capacitor unit, the units are designed for a convenient voltage rating, and a sufficient number of units are stacked up in series to meet the voltage requirements of a particular installation. A number of such stacks may be connected in parallel to give the desired total capacity. As shown in Fig. 6, the units are stacked one on top of the other, and the brackets 26 of adjacent units are bolted together by means of bolts 29 to connect the adjacent units together both mechanically and electrically. The stack of capacitor units is mounted on insulators 30, since the exposed end covers of the units are electrically energized, and the stack is connected to other similar stacks and to the circuit on which it is to be used by means of bus bars 31 secured to the brackets 26 of the top and bottom units, respectively. The cooling coils of all the units in a stack are preferably connected in series by means of rubber tubes 32, which insulate the live parts of the units from each other while permitting water to flow through the cooling coils of all the units in series. The cooling coils of the top and bottom units are connected to a suitable external water system, as indicated at 33.

It should now be apparent that a water-cooled capacitor unit has been provided in which the heat is very effectively removed, and which has very high current carrying capacity, so that a very high rating can be given to a unit of given size. This unit is of very rugged construction and can be built for approximately the same cost as the conventional types of units of similar size, but can be given a greatly increased rating because of the efficiency of cooling and the high current carrying capacity.

It will be understood, of course, that the invention is not restricted to the exact details of the particular embodiment selected for the purpose of illustration, but it is capable of various modifications and embodiments. It is to be understood, therefore, that the invention is not limited to the exact construction illustrated and described, but in its broadest aspect, it includes all equivalent modifications and embodiments which come within the scope of the appended claims.

I claim as my invention:

1. A capacitor unit comprising a generally cylindrical housing of insulating material, a capacitance element disposed in the housing, said capacitance element consisting of alternate layers of metallic foil and dielectric material with certain of the metallic foils extending beyond the dielectric layer at one side of the element and others of the foils extending beyond the dielectric layer at the other side of the element, a pair of circular metallic cooling plates placed one on each side of the capacitance element and clamped against it, each of said cooling plates having a plurality of generally radial slots therein, a cooling coil for the circulation of a liquid cooling medium secured to each of said cooling plates in the spaces between the slots, the extending foils of the capacitance element being permanently joined directly to the plates through at least some of said slots with connections of good thermal and electrical conductivity, and metal cover members closing each end of the housing and permanently sealed thereto, the ends of the cooling coils extending through the covers for the entrance and discharge of cooling medium and being secured thereto to provide electrical connection between the plates and the covers.

2. A capacitor unit comprising a generally cylindrical housing of insulating material, a capacitance element disposed in the housing, said capacitance element consisting of alternate layers of metallic foil and dielectric material with certain of the metallic foils extending beyond the dielectric layer at one side of the element and others of the foils extending beyond the dielectric layer at the other side of the element, a pair of circular metallic cooling plates placed one on each side of the capacitance element and clamped against it, each of said cooling plates having a plurality of generally radial slots therein, a cooling coil for the circulation of a liquid cooling medium secured to each of said cooling plates in the spaces between the slots, the extending foils of the capacitance element being permanently joined directly to the plates through at least some of said slots with connections of good thermal and electrical conductivity, metal cover members closing each end of the housing and permanently sealed thereto, the ends of the cooling coils extending through the covers for the entrance and discharge of cooling medium and being secured thereto to provide electrical connection between the plates and the covers, and metal bracket members secured externally to each of the covers for mechanical and electrical connection of the unit to an adjacent similar unit.

3. A capacitor unit comprising a generally cylindrical housing of insulating material, a capacitance element disposed in the housing, said capacitance element consisting of alternate layers of metallic foil and dielectric material with certain of the metallic foils extending beyond the dielectric layer at one side of the element and others of the foils extending beyond the dielectric layer at the other side of the element, a pair of circular metallic cooling plates placed one on each side of the capacitance element and clamped against it, each of said plates having a plurality of radial slots therein, a cooling coil for circulation of a liquid cooling medium secured to each of the plates, said cooling coils having a sinuous configuration to extend over the entire surface of the plates between the slots, the extending foils of the capacitance element being permanently joined directly to the cooling plates through said slots with connections of good thermal and electrical conductivity, and metal cover members closing both ends of the housing and permanently sealed thereto, the ends of said cooling coils extending through the cover members for the entrance and discharge of cooling medium and being secured thereto to provide electrical connection between the plates and the covers.

4. A capacitor unit comprising a generally cylindrical housing of insulating material, a capacitance element disposed in the housing, said capacitance element consisting of alternate layers of metallic foil and dielectric material with certain of the metalllic foils extending beyond the dielectric layer at one side of the element and others of the foils extending beyond the dielectric layer at the other side of the element, a pair of circular metallic cooling plates placed one on each side of the capacitance element and clamped against it, each of said plates having a plurality of radial slots therein, a cooling coil for circulation of a liquid cooling medium secured to each of the plates, said cooling coils having a sinuous configuration to extend over the entire surface of the plate between the slots, the extending foils of the capacitance element being permanently joined directly to the cooling plates through said slots with connections of good thermal and electrical conductivity, metal cover members closing both ends of the housing and permanently sealed thereto, the ends of said cooling coils extending through the cover members for the entrance and discharge of cooling medium and being secured thereto to provide electrical connection between the plates and the covers, and metal bracket members secured to each of the cover members for mechanical and electrical connection of the unit to an adjacent similar unit.

RALPH E. MARBURY.